(54) APPARATUS FOR RECOVERING SYMBOL TIMING IN CAP-BASED HIGH-SPEED COMMUNICATION SYSTEM USING SINGLE-SIDED PREFILTER PAIR

(75) Inventors: Key Hyun Kim, Euhwang-si (KR); Yong Chul Song, Seoul (KR); Beomsup Kim, Taejon-si (KR)

(73) Assignee: Korea Advanced Institute of Science and Technology, Taejon-si (KR)

( * ) Notice: Subject to any disclaimer, the term of this patent is extended or adjusted under 35 U.S.C. 154(b) by 0 days.

(21) Appl. No.: 09/337,149

(22) Filed: Jun. 21, 1999

(30) Foreign Application Priority Data

Sep. 18, 1998 (KR) .......................................... 98-38617

(51) Int. Cl.$^7$ ............................................... H03D 3/24
(52) U.S. Cl. ..................................................... 375/327
(58) Field of Search .................................. 375/327, 235, 375/354, 355, 316; 342/357; 359/173

(56) References Cited

U.S. PATENT DOCUMENTS 5,963,594 A * 10/1999 Farrow ........................ 375/229
6,249,557 B1 * 6/2001 Takatori et al. ............. 375/325
6,307,896 B1 * 10/2001 Gumm et al. ............... 375/316

OTHER PUBLICATIONS

IEEE Transactions on Communications, vol. Com–34, No. 11, Nov. 1986, by Aldo N. D'Andrea et al.
IEEE Transactions on Communications, vol. 36, No. 5, May 1988, by Martin Oerder et al.
IEEE Journal on Selected Areas in Communications, vol. 13, No. 4, May 1995, by G.–H. Im et al.

* cited by examiner

*Primary Examiner*—Stephen Chin
*Assistant Examiner*—Curtis Odom
(74) *Attorney, Agent, or Firm*—Bachman & LaPointe, P.C.

(57) ABSTRACT

An apparatus for recovering symbol timing in a CAP-based high-speed communication system such as an ADSL or VDSL, using a single-sided prefilter pair, in which timing information is obtained by means of the single-sided prefilter pair and a multiplier instead of a squaring unit used in general communication systems, for the recovery of accurate data, so that the symbol timing can be recovered through a digital signal process at a clock rate which is four times as high as a symbol transmission rate. According to the present invention, the single-sided prefilter pair and multiplier are used instead of the squaring unit spreading a frequency band. Therefore, the frequency band is not spread, so that the timing can be obtained with no signal overlapping due to sampling, although a sampling frequency is four times as high as a symbol frequency. Further, band components unnecessary to the timing information extraction are removed from a transmitted signal by filtering it respectively at higher and lower frequency bands, and the timing information is obtained by multiplying the two filtered signals by each other. These have the effect of reducing a timing jitter which may occur on a specific pattern of data due to the filtering.

2 Claims, 4 Drawing Sheets

APPARATUS FOR RECOVERING SYMBOL TIMING IN CAP-BASED HIGH-SPEED COMMUNICATION SYSTEM USING SINGLE-SIDED PREFILTER PAIR

BACKGROUND OF THE INVENTION

1. Field of the Invention

The present invention relates in general to a symbol timing recovery apparatus, and more particularly to an apparatus for recovering symbol timing in a carrierless AM/PM (CAP)-based high-speed communication system such as an asymmetric digital subscriber line (ADSL) or very high-rate digital subscriber line (VDSL), using a single-sided prefilter pair, in which timing information is obtained by means of the single-sided prefilter pair and a multiplier instead of a squaring unit used in general communication systems, for the recovery of accurate data, so that the symbol timing can be recovered through a digital signal process at a clock rate which is four times as high as a symbol transmission rate.

2. Description of the Prior Art

Generally, in the case where an unshielded twisted-pair (UTP), which is a typical telephone line, is used as a transmission line for a high-speed communication system, a signal may be transmitted therethrough while being subjected to a great distortion resulting from a channel characteristic and high-speed data transmission. For the recovery of accurate data from such a signal, it is very important to first recover accurate symbol timing therefrom.

Further, according to the recent trend where it is of greater interest to integrate various function blocks into one integrated circuit (IC) to reduce the size and production cost of the entire system, it is required that a symbol timing recovery block be integrated with a data recovery block such as a channel equalizer, which is typically implemented in a digital manner, into one IC. In this connection, it is preferred that the symbol timing recovery block is implemented in a digital manner similarly to the data recovery block.

On the other hand, a carrierless AM/PM (CAP) method is to place data on in-phase and quadrature-phase of a signal by varying an amplitude of the signal. The CAP method is analogous to a quadrature amplitude modulation (QAM) method, but it is different from the QAM method in taking a center frequency of the signal for mixing of the in-phase and quadrature-phase, not as an integer multiple of a symbol frequency, but as a real number multiple of the symbol frequency such as, for example, 0.8 times. The CAP method is further characterized by the use of only a pulse shaping filter. For example, a 16-CAP method is one of various methods used in a high-speed digital subscriber line (DSL) which is now of more interest.

In a conventional low-speed DSL or other communication systems employing the QAM method analogous to the CAP method, a squaring unit is used to obtain symbol timing information. The squaring unit squares a signal in digital implementation, resulting in the signal being spread in frequency band. For this reason, in sampling the signal, there is required a clock with a frequency which is higher than four times the symbol frequency.

Accordingly, when such a conventional symbol timing recovery method is applied to a high-speed communication system, it requires a sampling frequency in a frequency band difficult to handle in the digital implementation. In other words, the conventional symbol timing recovery method is not suitable for the high-speed communication system.

On the other hand, shown in Korean Patent Application No. 96-15472 is a timing recovery apparatus for a data transmission/reception system which comprises an analog/digital converter for converting an input analog signal into a digital signal, a prefilter for prefiltering an output signal from the analog/digital converter to output only a component for the extraction of a symbol frequency, a phase comparator for generating a phase difference signal in response to an output signal from the prefilter, and a normalizer for normalizing the phase difference signal from the phase comparator and applying the normalized result as a sampling clock control signal to the analog/digital converter.

However, the above-mentioned conventional timing recovery apparatus is disadvantageous in that it cannot recover accurate symbol timing in the case where a transmitted signal was modulated by the CAP method.

As a result, there has been required a technique which is suitable for a high-speed communication system employing the CAP method and capable of recovering symbol timing using a clock with a frequency which is four times as high as a symbol frequency, so that it can be integrated with a data recovery block.

SUMMARY OF THE INVENTION

Therefore, the present invention has been made in view of the above problem, and it is an object of the present invention to provide an apparatus for recovering symbol timing in a CAP-based high-speed communication system using a single-sided prefilter pair, which is capable of being integrated with a data recovery block in a data recovery process and accurately recovering the symbol timing using a clock with a frequency which is four times as high as a symbol frequency.

In accordance with the present invention, the above and other objects can be accomplished by a provision of an apparatus for recovering symbol timing in a CAP-based highspeed communication system using a single-sided prefilter pair, comprising an analog/digital converter for converting a transmitted signal into a digital signal in response to a sampling clock; the single-sided prefilter pair including a low pass prefilter for low pass prefiltering an output signal from the analog/digital converter to provide symbol timing information at a lower frequency band, and a high pass prefilter for high pass prefiltering the output signal from the analog/digital converter to provide symbol timing information at a higher frequency band; a multiplier for multiplying output signals from the low pass prefilter and high pass prefilter by each other; a band pass filter for band pass filtering an output signal from the multiplier to extract accurate frequency information therefrom; a phase detector for detecting a symbol timing phase from an output signal from the band pass filter; a loop filter for normally maintaining a closed loop; and a voltage controlled oscillator for generating the sampling clock in response to a signal which is transferred from the phase detector through the loop filter.

The single-sided prefilter pair and multiplier are used instead of a squaring unit to prevent a frequency band from being spread. Therefore, the timing can be obtained with no signal overlapping due to sampling although a sampling frequency is four times as high as a symbol frequency. Further, a timing jitter can be reduced which may occur on a specific pattern of data.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
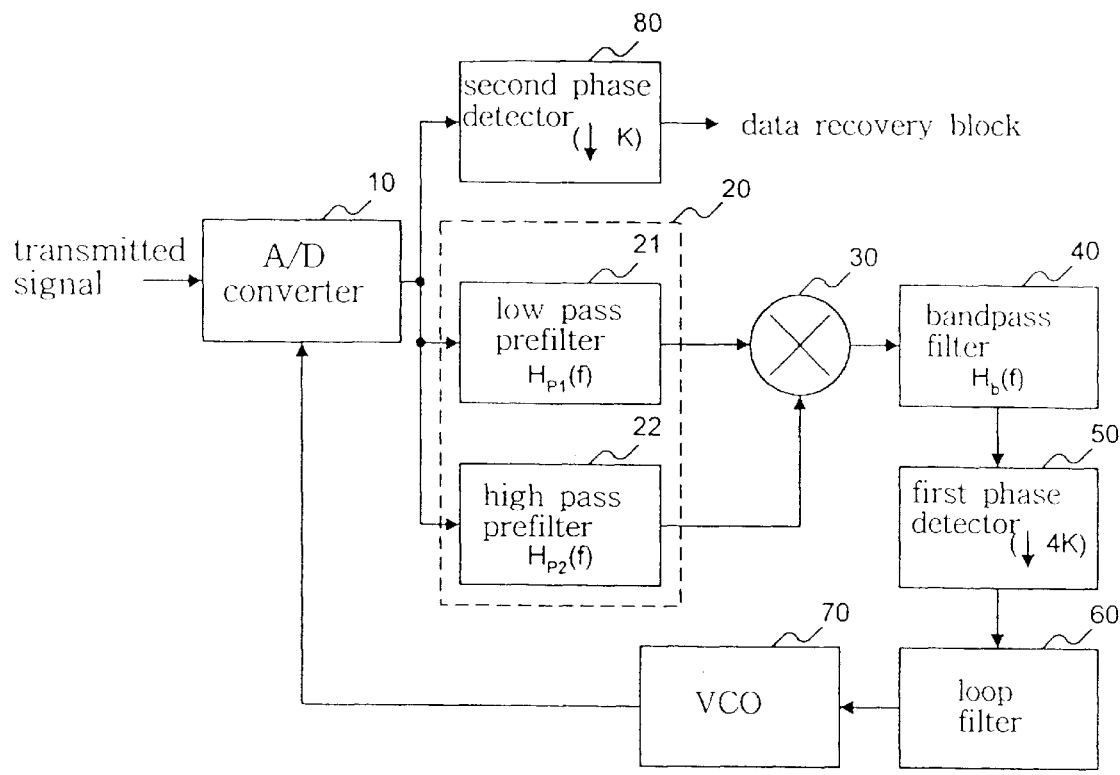
FIG. 1 is a block diagram of a symbol timing recovery apparatus in accordance with the present invention.

FIG. 1 is a block diagram of a symbol timing recovery apparatus for a CAP-based high-speed communication system in accordance with the present invention. As shown in this drawing, the symbol timing recovery apparatus comprises an analog/digital (A/D) converter 10, single-sided prefilter pair 20 including a low pass prefilter 21 and high pass prefilter 22, multiplier 30, band pass filter 40, first phase detector 50, second phase detector 80, loop filter 60 and voltage controlled oscillator (VCO) 70.

The A/D converter 10 converts a transmitted signal into a digital signal in response to a sampling clock which is supplied from the VCO 70 as will be mentioned later in detail.

In the single-sided prefilter pair 20, the low pass prefilter 21 low pass prefilters the digital signal from the A/D converter 10 to provide symbol timing information at a lower frequency band. The high pass prefilter 22 high pass prefilters the digital signal from the A/D converter 10 to provide symbol timing information at a higher frequency band.

The multiplier 30 multiplies both sideband components of the transmitted signal, filtered respectively by the low pass prefilter 21 and high pass prefilter 22, by each other to provide the final symbol timing information.

The band pass filter 40 band pass filters the symbol timing information from the multiplier 30 to accurately obtain a desired symbol frequency.

The first phase detector 50 detects a symbol timing phase from an output signal from the band pass filter 40 to provide a digital value (sampled value) of a sinusoidal wave signal with a frequency which is four times as high as the symbol frequency.

The loop filter 60 normally maintains a closed loop. The VCO 70 supplies the sampling clock to the A/D converter 10 in response to a signal which is transferred from the first phase detector 50 through the loop filter 60. As a result, the sampling clock is generated at the frequency which is four times as high as the symbol frequency.

The second phase detector 80 transfers the digital signal (sampled signal) from the A/D converter 10 to a data recovery block (not shown).

The operation of the symbol timing recovery apparatus with the above-mentioned construction in accordance with the present invention will hereinafter be described in detail.

First, a transmitted signal is sampled at a frequency of four times the highest symbol frequency by the A/D converter 10 in response to the sampling clock from the VCO 70 and then applied to the data recovery block, not shown, through the second phase detector 80. The operation of recovering symbol timing as a basis of the sampling clock is performed in the following manner.

Figure 2A:
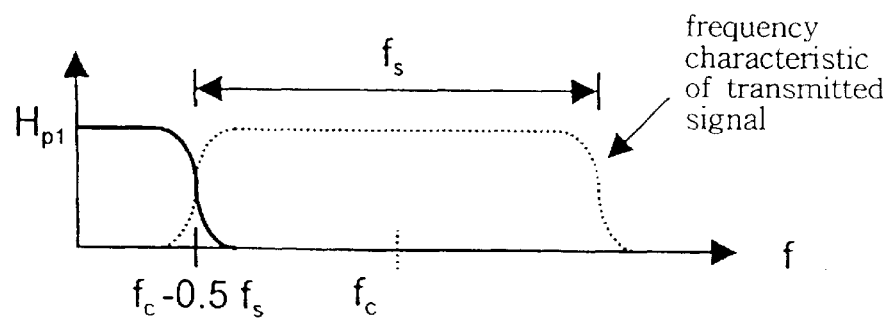
FIG. 2a is a graph illustrating a frequency response characteristic of a low pass prefilter.
Figure 2B:
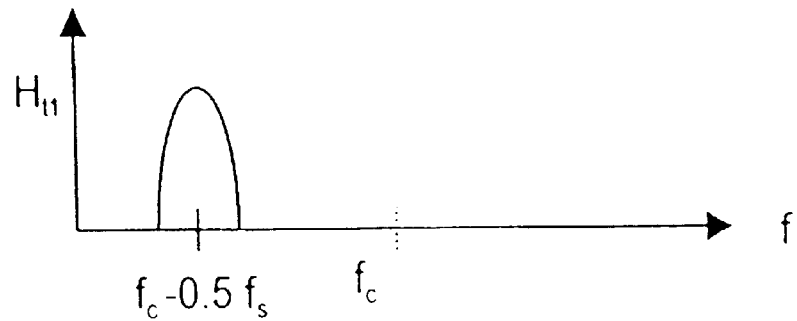
FIG. 2b is a graph illustrating a frequency characteristic of a low pass prefiltered signal.
Figure 2C:
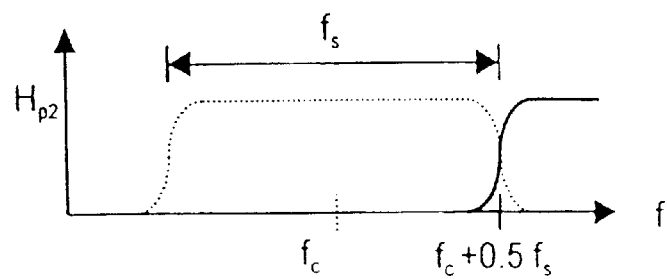
FIG. 2c is a graph illustrating a frequency response characteristic of a high pass prefilter.
Figure 2D:
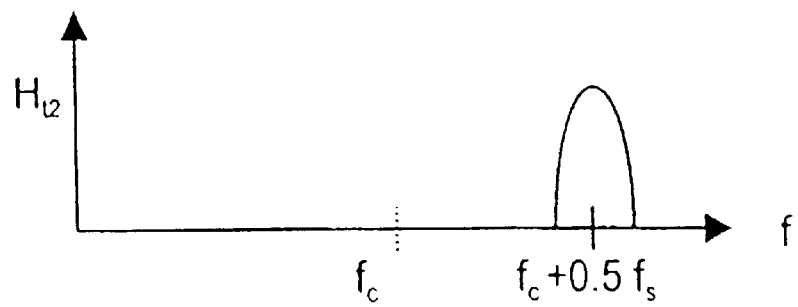
FIG. 2d is a graph illustrating a frequency characteristic of a high pass prefiltered signal.

The low pass prefilter 21 and high pass prefilter 22 in the single-sided prefilter pair 20 have frequency response characteristics as shown in FIGS. 2a and 2c, respectively. On the basis of these frequency response characteristics, the low pass prefilter 21 and high pass prefilter 22 filter both sideband components of the transmitted signal, respectively, as shown in FIGS. 2b and 2d. Then, the resultant symbol timing information from the low pass prefilter 21 and high pass prefilter 22 are applied respectively to both inputs of the multiplier 30.

Figure 3:
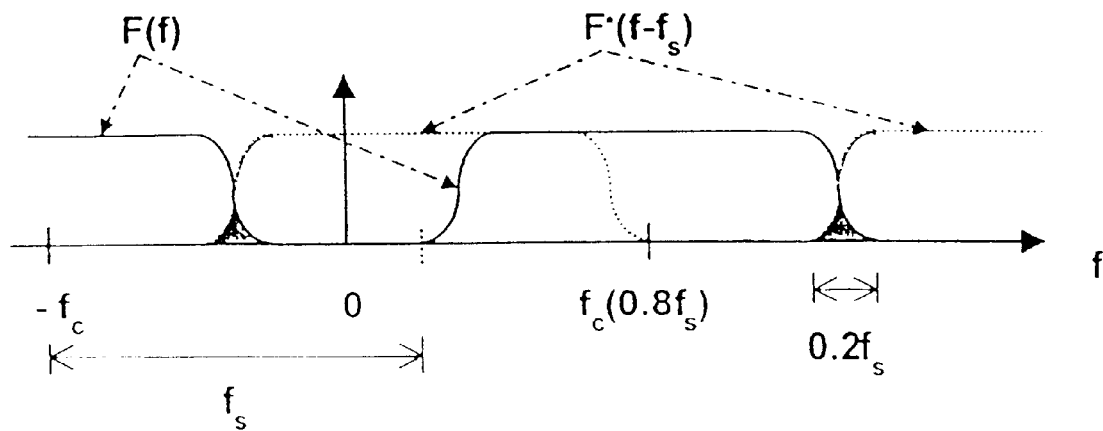
FIG. 3 is a view illustrating the conception of the extraction of symbol timing information.

Noticeably, in a conventional symbol timing recovery method using a squaring unit, timing information is obtained in proportion to the area of a painted region in FIG. 3. As a result, the squaring unit is used to obtain such timing information. But, in the present invention, the multiplying of two filtered signals has the effect of obtaining timing information in a frequency region which is substantially the same as that in the conventional method.

In other words, according to the present invention, timing information can be obtained without spreading the frequency band and a timing jitter can be reduced by prefiltering the associated signal.

The two filtered signals with no unnecessary band component, or timing information are multiplied by each other by the multiplier 30 and the multiplied result is then applied as the final symbol timing information to the band pass filter 40.

The band pass filter 40 band pass filters the symbol timing information from the multiplier 30 to obtain more accurate timing information (frequency), which is then supplied to the first phase detector 50. The first phase detector 50 generates a sampled value of a sinusoidal wave signal with a frequency corresponding to four times the highest symbol frequency, thereby allowing a closed loop through the loop filter 60 and VCO 70, or a timing recovery block, to be operated at every 4kth sample. As a result, a sampling clock is obtained which has the most stable and optimum timing.

Figure 4A:
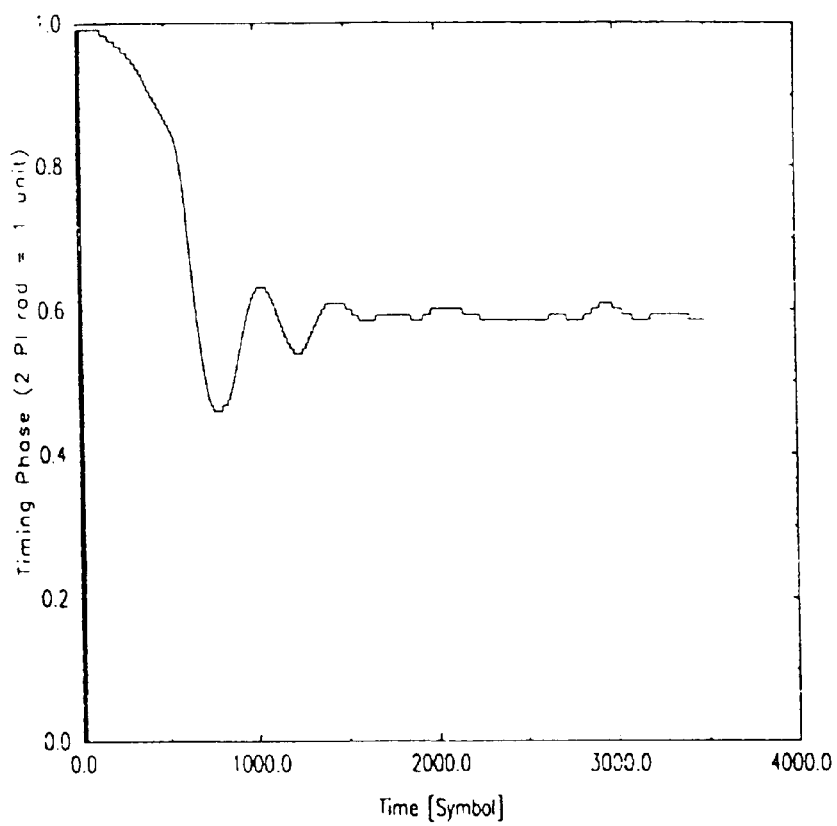
FIGS. 4a and 4b are graphs illustrating an operating characteristic of the symbol timing recovery apparatus in FIG. 1.
Figure 4B:
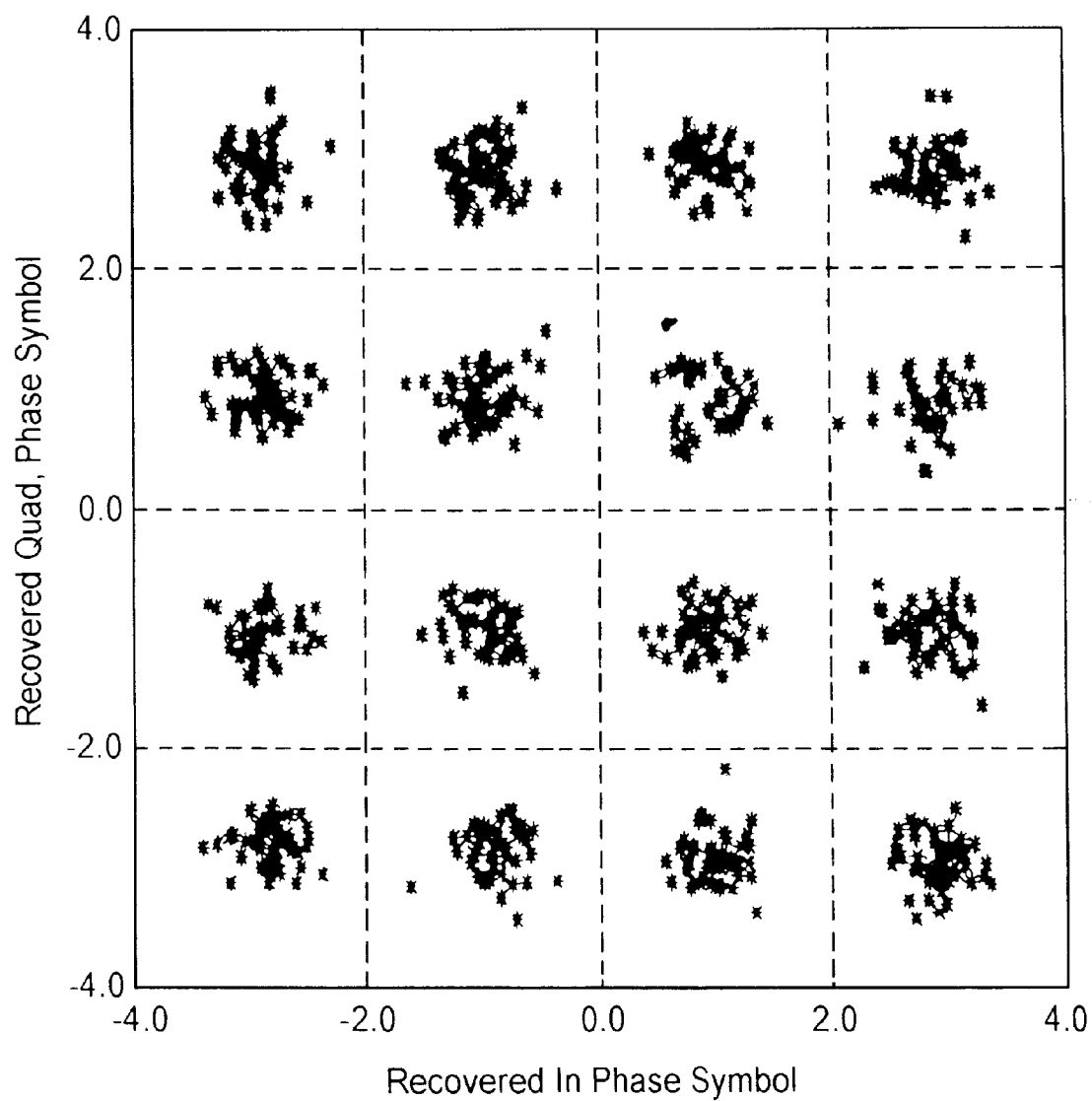

FIGS. 4a and 4b are graphs illustrating an operating characteristic of the symbol timing recovery apparatus in FIG. 1. As seen from these drawings, the symbol timing recovery apparatus of the present invention can stably obtain accurate timing.

FIG. 4a shows a procedure where accurate timing is obtained by the present timing recovery apparatus. It can be seen from this drawing that there is less of a timing jitter at a more stable state. FIG. 4b shows the recovery of data sampled according to timing obtained by the present timing recovery apparatus in the case where the present timing recovery apparatus is applied to a signal modulated in a 16-CAP manner.

Especially, the symbol timing recovery apparatus of the present invention may be applied in consideration of noise and loss of an unshielded twisted-pair (UTP). In this case, stable timing can be obtained and accurate data can be recovered through transmission line equalization, etc.

As apparent from the above description, according to the present invention, the single-sided prefilter pair and multiplier are used instead of a squaring unit spreading a frequency band. Therefore, the frequency band is not spread, so that timing can be obtained with no signal overlapping due to sampling, although the sampling frequency is four times as high as the symbol frequency.

Further, band components unnecessary to the timing information extraction are removed from the transmitted signal by filtering it respectively at higher and lower frequency bands, and the timing information is obtained by multiplying the two filtered signals by each other. These have the effect of reducing a timing jitter which may occur on a specific pattern of data due to the filtering.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for recovering symbol timing in a CAP-based high-speed communication system using a single-sided prefilter pair, comprising:

an analog/digital converter for converting a transmitted signal into a digital signal in response to a sampling clock;

said single-sided prefilter pair including a low pass prefilter for low pass prefiltering an output signal from said analog/digital converter to provide symbol timing information at a lower frequency band, and a high pass prefilter for high pass prefiltering the output signal from said analog/digital converter to provide symbol timing information at a higher frequency band;

a multiplier for multiplying output signals from said low pass prefilter and high pass prefilter by each other;

a band pass filter for band pass filtering an output signal from said multiplier to extract accurate frequency information therefrom;

a phase detector for detecting a symbol timing phase from an output signal from said band pass filter;

a loop filter for normally maintaining a closed loop; and a voltage controlled oscillator for generating said sampling clock in response to a signal which is transferred from said phase detector through said loop filter.

2. The apparatus as set forth in claim 1, wherein said phase detector is adapted to detect the phase of a frequency which is four times as high as a symbol frequency.

* * * * *